UNITED STATES PATENT OFFICE.

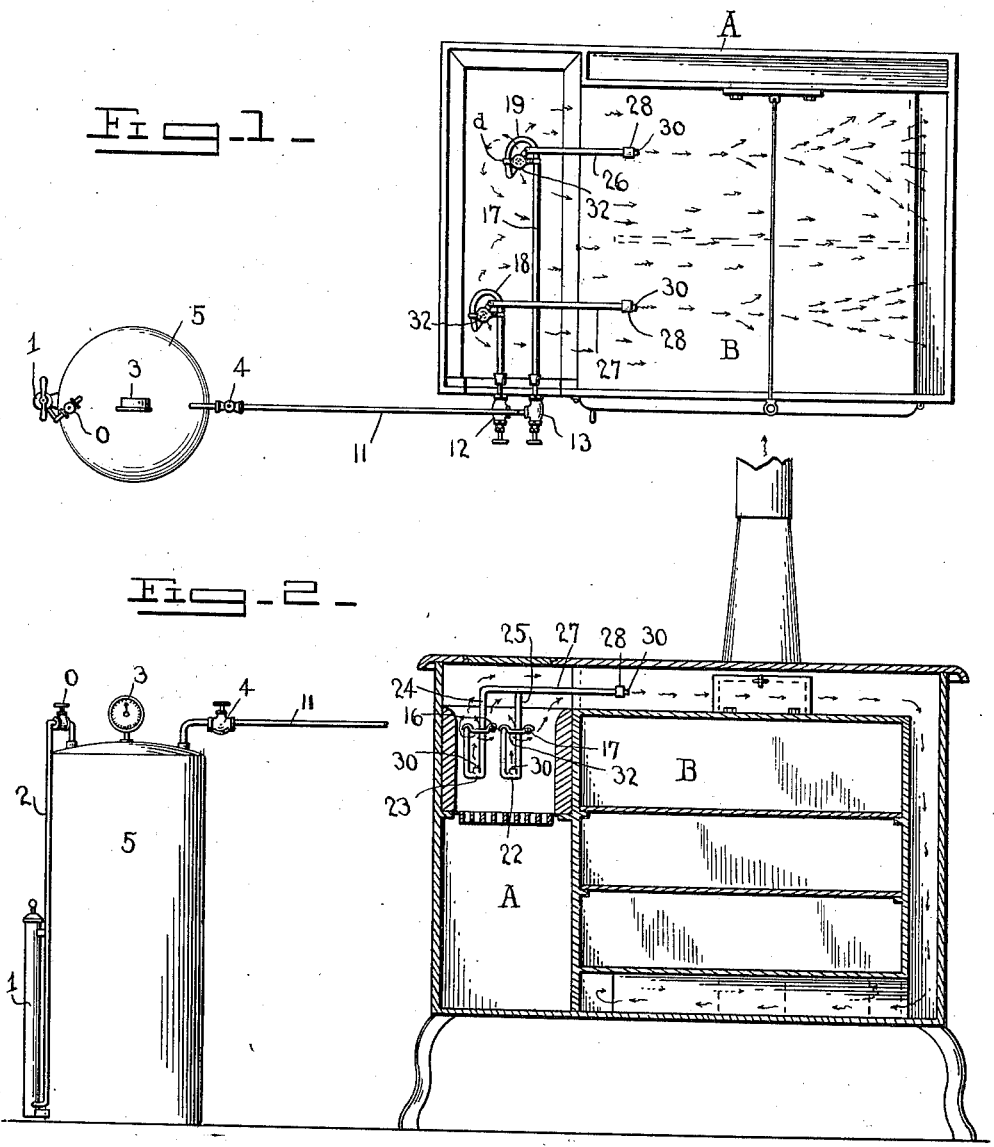

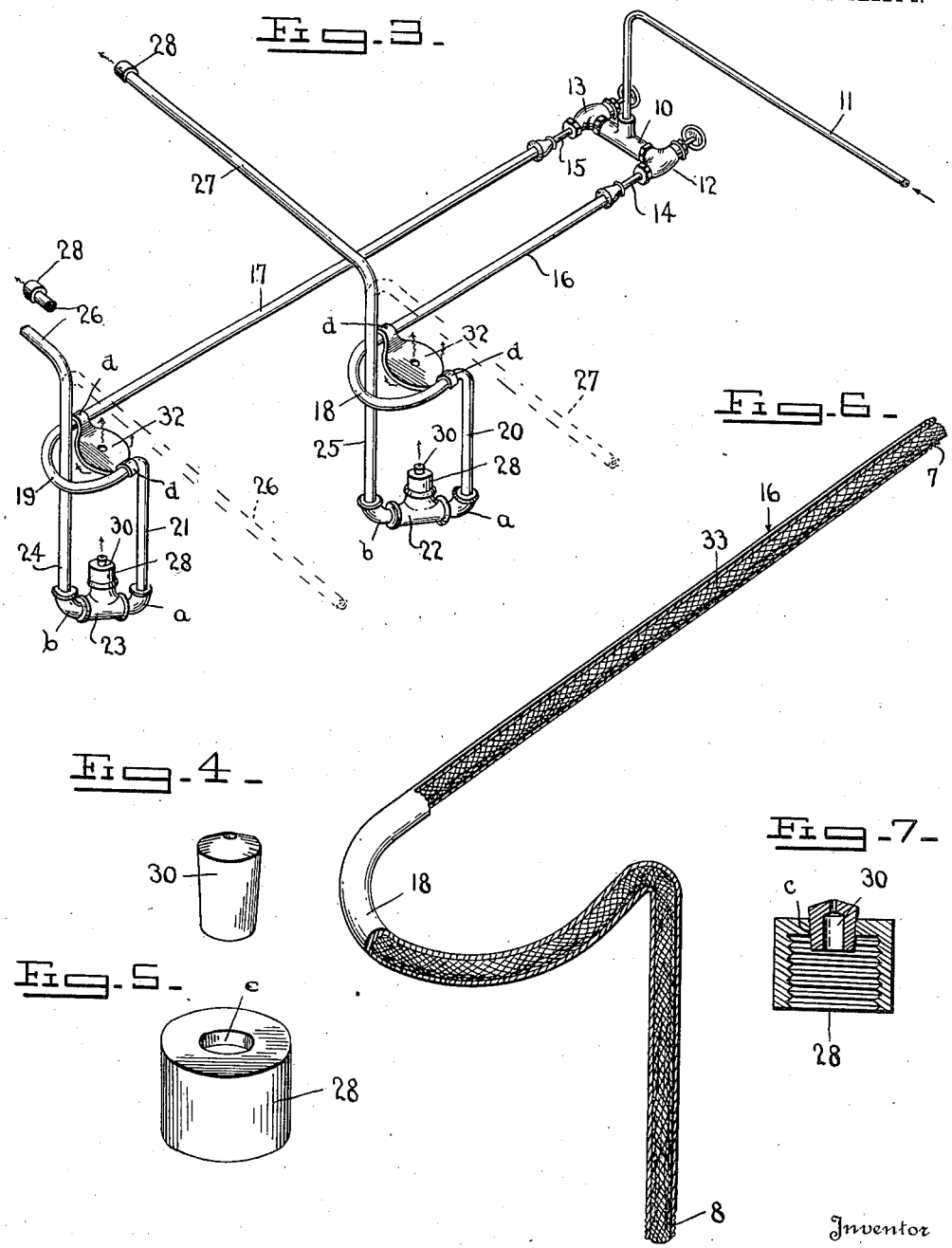

JAMES H. BOWLING, OF RUSSELLVILLE, KENTUCKY.

OIL-BURNER.

1,093,249. Specification of Letters Patent. Patented Apr. 14, 1914.

Application filed December 16, 1913. Serial No. 807,034.

*To all whom it may concern:*

Be it known that I, JAMES H. BOWLING, a citizen of the United States, and a resident of Russellville, in the county of Logan and State of Kentucky, have invented certain new and useful Improvements in Oil-Burners, of which the following is a specification, reference being had to the accompanying drawings.

My invention has for its object to improve the construction and operation of that class of liquid fuel burners especially adapted to be used for domestic cooking and heating purposes to the end that a cheap, portable, positively operating fuel burner may be supplied to the public.

To this end the invention comprises an oil burner to which is fed a liquid fuel under pressure, the burner being arranged to be readily placed in a fire box or in a cooking stove or kitchen range to provide ample heating jets within the fire box as well as providing flame jets distributing the heat over and around the oven, insuring the stove or range being used for baking as well as cooking on the top of the stove.

A further object is to provide a burner which can be placed below a boiler to speedily heat the contents thereof.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views: Figure 1 shows a plan view of a kitchen stove with the top removed, disclosing a burner embodying my invention in connection therewith. Fig. 2 shows an elevational view of Fig. 1, with parts broken away. Fig. 3 shows a perspective view of the burner proper with parts broken away. Fig. 4, shows a perspective view of one of the tips as used in my invention. Fig. 5 shows a detached detail of one of the tip caps. Fig. 6 shows a sectional detail of one of the fuel pipes disclosing the location of the wool filler. Fig. 7 shows a sectional view of one of the tip caps with a connected tip.

In my present invention I provide a liquid fuel burner especially adapted for household purposes to provide a cooking or heating stove with a liquid fuel burner, which can be readily placed in position within the fire box of a cooking stove or kitchen range.

In carrying out the aim of my invention I employ a burner comprising a T 10. Entering this T 10 is the supply pipe 11 which has its end entering a fuel tank 5. This supply pipe 11, is provided with a suitable valve 4, shown in Fig. 2. The fuel tank 5, is provided with a pump 1, from which extends a pipe 2 having a valve 0. By means of this pump the pressure necessary to expel the fuel from the tank is provided a gage 3 being used to show the amount of pressure within the tank. At each end the T has secured to it a needle valve, these being marked 12 and 13, and being particularly shown in Fig. 3. Extending from these needle valves 12 and 13 are the nipples marked 14 and 15 respectively, and these nipples are adapted to receive the threaded ends of the fuel pipes 16 and 17, which extend from the nipples 14 and 15 in parallel spaced relation. As shown the pipe 16 has a crook or recurved portion 18 from which is continued at right angles a threaded end section 20 forming an angular extension, while the fuel pipe 17 which is somewhat longer than the pipe 16 has the crook or recurved portion 19 from which is continued at right angles the threaded end section 21 also forming an angular extension. These angular extensions or end sections 20 and 21 also extend in parallel spaced relation. The T and the valves 12 and 13 form what I term a valve head.

In Fig. 6 the fuel pipe 16 is shown, the threaded ends being marked 7 and 8. No detail view of the similar pipe 17 is shown. Each of these fuel pipes 16 and 17 is provided with the wool filler 33, which acts to retard the impurities within the oil, and also to assist in heating the oil when these pipes are heated.

Secured to each end section 20 and 21 and extending at right angles therefrom are the burner heads 22 and 23 each being provided with a tip cap 28, threaded to a portion thereof, one of said tip caps being shown in detail in Fig. 7. Each tip cap has a central aperture or fuel outlet $c$ within which is held a burner tip 30 of sheet metal to insure a smokeless, steady flame. As shown in Fig. 3, each burner head 22 and 23 has the threaded sockets $a$ and $b$, into one of which the ends 20 and 21 extend, while extending into the opposite sockets $b$, are the lower ends 24 and 25 of the burner pipes 26 and 27. These burner pipes as shown in Figs. 2 and 3, are bent L-shaped, the ends 24 and 25 being continued through the fuel pipe bends 18 and 19 and continued beyond the pipes 16 and 17. The pipe ends 26 and 27 extend in parallel spaced relation at right angles to, the pipes 16 and 17, and above the same as shown in Fig. 2. The ends of these pipes 26 and 27 are also provided with a cap 28 holding a burner tip 30. Held above each burner head 22 and 23 is a baffle plate 32, each baffle plate having a central aperture while the ends $d$ of these baffle plates are hung over the recurved pipe portions 18 and 19, as clearly shown in Fig. 3. These baffle plates aid in evenly distributing the heat within the fire box, while at the same time allowing a flame to escape through the apertures within the baffle plate.

As shown in Figs. 1 and 2, the stove is provided with suitable openings sufficient to receive the nipples 14 and 15 by means of which the burner is held within the fire box. In this position the burner heads 22 and 23 will be below the stove openings within the front part of the stove, while the pipes 26 and 27 are directed over the top of the oven so that when the burner is lighted the flames will distribute their heat over and around the oven B of the stove A, as shown in Fig. 2, insuring a steady heat that will be free of soot and smoke, and which can be nicely and evenly adjusted when regulated.

While the drawing shows a burner having but two burner heads, and two oven heating tips it should be understood that a greater number of jets may be employed. So also may these burners be used in heating furnaces.

The gas tips 30 are preferably made of talc and insure an even, steady flame.

In the use of the burner, as the fuel is forced through the pipes 16 and 17 which are heated, the filler within these pipes heats the oil to be instantly converted into a gas which readily burns without smoke.

These burners are so constructed that they may be made to readily fit into any fire box, the pipe sections 16 and 17 being lengthened or shortened to meet the necessary condition.

Further adjustment is possible in using the nipples 14 and 15 of different lengths, thereby insuring the proper location of the burner heads 22 and 23 within the stove or range.

A furnace constructed according to my invention is simple and inexpensive in construction, and both durable and efficient in operation, and the burner may be removed or replaced within a stove or range with ease, accuracy and despatch.

Having thus described my said invention what I claim is:

1. A liquid fuel burner, comprising in combination, a T, a supply pipe entering said T, a needle valve secured to each end of said T, a nipple extending from each valve, a fuel pipe extending from each nipple, said pipes held in parallel spaced relation each ending in a recurved portion from which is continued at right angles a threaded end section, said end sections held in parallel spaced relation, one of said pipes being shorter than the other, a burner head secured at right angles to each end section, and a burner pipe bent L-shaped extending from each head, one end of each burner pipe continued through the bend of one fuel pipe, the other ends of said burner pipes extending in parallel spaced relation at right angles to and above said fuel pipes.

2. A liquid fuel burner, comprising in combination, a T, a supply pipe entering said T, a needle valve secured to each end of said T, a nipple extending from each valve, a fuel pipe extending from each nipple, said pipes held in parallel spaced relation each ending in a recurved portion from which is continued at right angles a threaded end section, said end sections held in parallel spaced relation, one of said pipes being shorter than the other, a burner head secured at right angles to each end section, a burner pipe bent L-shaped extending from each head, one end of each burner pipe continued through the bend of one fuel pipe, the other ends of said burner pipes extending in parallel spaced relation at right angles to and above said fuel pipes, and a burner tip secured to each of said heads.

3. A liquid fuel burner, comprising in combination, a T, a supply pipe entering said T, a needle valve secured to each end of said T, a nipple extending from each valve, a fuel pipe extending from each nipple, said pipes held in parallel spaced relation each ending in a recurved portion from which is continued at right angles a threaded end section, said end sections held in parallel spaced relation, one of said pipes being shorter than the other, a burner head secured at right angles to each end section, a burner pipe bent L-shaped extending from each head, one end of each burner pipe continued through the bend of one fuel pipe, the other ends of said burner pipes extending in parallel spaced relation at right angles to and above said fuel pipes, a burner tip secured to each of said heads, and a baffle plate having its ends secured to the recurved portions of each of said fuel pipes and held above said burner tips.

4. A liquid fuel burner, comprising in combination, a T, a supply pipe entering said T, a needle valve secured to each end of said T, a nipple extending from each valve, a fuel pipe extending from each nipple, said pipes held in parallel spaced relation each ending in a recurved portion from which is continued at right angles a threaded end section, said end sections held in parallel spaced relation, one of said pipes being shorter than the other, a burner head secured at right angles to each end section, a burner pipe bent L-shaped extending from each head, one end of each burner pipe continued through the bend of one fuel pipe, the other ends of said burner pipes extending in parallel spaced relation at right angles to and above said fuel pipes, a burner tip secured to each of said heads, a baffle plate having its ends secured to the recurved portions of each of said fuel pipes and held above said burner tips, and a metal filler within said fuel pipes.

5. A liquid fuel burner, comprising in combination, a T, a supply pipe entering said T, a needle valve secured to each end of said T, a nipple extending from each valve, a fuel pipe extending from each nipple, said pipes held in parallel spaced relation each ending in a recurved portion from which is continued at right angles a threaded end section, said end sections held in parallel spaced relation, one of said pipes being shorter than the other, a burner head secured at right angles to each end section, a burner pipe bent L-shaped extending from each head, one end of each burner pipe continued through the bend of one fuel pipe, the other ends of said burner pipes extending in parallel spaced relation at right angles to and above said fuel pipes, a burner tip secured to each of said heads, a baffle plate having its ends secured to the recurved portions of each of said fuel pipes and held above said burner tips, a metal filler within said fuel pipes, and a burner tip secured to the end of each burner pipe.

6. A burner of the class described, comprising a valve head, a fuel pipe extending from said head terminating in an angular extension, a burner head secured to said extension located below said fuel pipe, and a burner pipe continued from said burner head bent at right angles and ending in a fuel opening.

7. A liquid fuel burner comprising in combination, a head, a supply pipe entering said head, a valve secured to each end of said head, a fuel pipe extending from each valve said pipes held in parallel spaced relation each ending in a recurved portion from which is continued at right angles an end section, said end sections held in parallel spaced relation, one of said fuel pipes being shorter than the other, a burner head secured at right angles to each end section, and a burner pipe bent L-shaped extending from each head, one end of each burner pipe continued through the bend of one fuel pipe.

8. A liquid fuel burner having in combination, a valve head, a supply pipe entering said valve head, fuel pipes extending from said valve head in parallel spaced relation each ending in an end section extending at right angles to the plane of said fuel pipes, a burner head secured to each end section each burner head having a fuel outlet, and a burner pipe continued from each burner head, said burner pipes being bent at right angles each ending in a fuel opening, said burner pipes extending at right angles to said fuel pipes.

9. In combination, a valve head, a plurality of fuel pipes of different lengths extending from said head each terminating in an end section extending at right angles, a burner head secured to the end of each end section located below said fuel pipes, and an L-shaped burner pipe continued from each burner head and extending at right angles to said fuel pipes.

In testimony whereof I affix my signature, in the presence of two witnesses.

JAMES H. BOWLING.

Witnesses:
F. J. DONOVAN,
C. W. TOMLINSON.

---

Copies of this patent may be obtained for five cents each, by addressing the "Commissioner of Patents, Washington, D. C."